United States Patent [19]

Mills et al.

[11] Patent Number: 4,898,371

[45] Date of Patent: Feb. 6, 1990

[54] QUICK-CHANGE VISE

[76] Inventors: Perry A. Mills, 18700 Bell Dr., Nevada City, Calif. 95959; Joel DiMarco, 4288 Revere Pl., Culver City, Calif. 90230

[21] Appl. No.: 169,596

[22] Filed: Mar. 17, 1988

[51] Int. Cl.[4] .............. B23Q 3/02

[52] U.S. Cl. .............. 269/136; 269/280; 269/286

[58] Field of Search .............. 269/136, 273, 286, 261, 269/279, 280, 283, 259; 81/421, 422, 423

[56] References Cited

U.S. PATENT DOCUMENTS

| | | |
|---|---|---|
| 789,405 | 5/1905 | Ascher . |
| 2,373,384 | 4/1945 | Cross et al. . |
| 2,435,256 | 2/1948 | Whitmore . |
| 2,451,733 | 10/1948 | Hochwarder . |
| 2,553,802 | 5/1951 | Woods . |
| 2,631,483 | 3/1953 | Swain . |
| 3,107,562 | 10/1963 | Miller . |
| 3,166,853 | 1/1965 | Marcus . |
| 3,325,162 | 6/1967 | Lukas . |
| 3,463,478 | 8/1969 | Hennessey . |
| 3,463,479 | 8/1969 | Hennessey . |
| 3,622,145 | 11/1971 | Gibson . |
| 3,850,422 | 11/1974 | Kwas . |
| 4,139,188 | 2/1979 | Avedian . |
| 4,186,916 | 2/1980 | Varga . |
| 4,251,065 | 2/1981 | McDougal . |

FOREIGN PATENT DOCUMENTS

| | | | |
|---|---|---|---|
| 51280 | 12/1911 | Austria | 269/273 |
| 1199875 | 9/1957 | France | 269/136 |
| 2455950 | 11/1979 | France | 269/280 |

*Primary Examiner*—Frederick R. Schmidt
*Assistant Examiner*—David A. Holmes
*Attorney, Agent, or Firm*—Hill, Van Santen, Steadman & Simpson

[57] ABSTRACT

A quick-change vise including a T-shaped clamp extending from within a jaw member which engages a T-shaped channel in a jaw blank to releasably secure the jaw blank to the jaw member. The jaw blank may be provided with a parallel bar or angle parallel to provide horizontal or angled supporting surfaces to a workpiece held in the vise. The jaw blank may be positioned in reversible positions on the clamp. Additionally, the jaw blank may be made of an extrudable metal such as aluminum.

7 Claims, 3 Drawing Sheets

QUICK-CHANGE VISE

BACKGROUND OF THE INVENTION

1. Field of the Invention

The present invention pertains generally to vises and specifically to a clamping system for releasably securing a jaw blank to a vise jaw member, and a variety of jaw blank systems usable with the clamping system.

2. Discussion of the Art

A typical manner in which vise jaw blanks are releasably secured to a vise jaw member is described in U.S. Pat. No. 4,251,065. A rectangular blank is attached to a jaw member face by shoulder bolts inserted first through the jaw blank and then into the jaw member. The bolts are tightened until the heads are flush with the surface of the blank to secure the blank. This provides a flat gripping surface for holding a similarly flat workpiece between two such surfaces. The bolts are loosened and removed to allow removal of the blank.

However, problems exist in the use of such a system for securing a jaw blank to a jaw member. First, the vise jaws must be separated at least the length of a bolt in order to remove or secure a jaw blank. Second, time and effort must be spent to untighten or tighten at least two bolts for each jaw throughout their entire length. Third, the blank gripping surface is not a completely flat plane because of the bores required for the bolts. Care must be taken to ensure that the bolts are seated within their bores to assure a flat gripping surface.

In U.S. Pat. No. 3,107,562, there is disclosed an assembly in which a tool head holder is removably secured to a tool head. The tool head holder is mounted on a dovetail protrusion, a bottom portion of which is moveable to securely wedge the tool holder onto a tool head.

SUMMARY OF THE INVENTION

The present invention overcomes the undesirable aspects of the typical manner for securing a jaw blank to a jaw member. The invention provides for clamping means which avoids the need for bolts inserted through the blank gripping surface, thus eliminating any problems previously associated with the bolts and bores. For example, the present jaw blank may be a truly continuous flat smooth surface. Moreover, less time and effort is needed to change blanks as the blanks are secured by a quick release clamping system.

In the present invention there is provided a rectangular blank containing a T-shaped channel throughout its length at the side thereof facing the vise jaw member. A cam operated clamp with a complementary T-shaped section is located within a vise jaw member. The blank is secured to the jaw member by simply sliding the blank sideways onto the T-shaped clamp, with the clamp loosely accepting the blank, and turning the cam until the jaw blank is held tightly against the jaw member. The cam need only be turned less than a turn. To release the blank, one need only turn the cam in the opposite direction until the jaw blank can be removed by sliding it off of the clamp.

The instant invention further provides various jaw blanks which include parallel systems and angle parallel systems which may also be quickly secured or removed. Additionally, there is included an adaptor for adapting the instant invention to existing vises employing the typical prior art method for securing jaw blanks to jaw members.

Therefore, it is an object of the instant invention to provide a system for releasably securing a jaw blank to a vise jaw member which requires very little time and effort to effectuate. It is an aspect of the invention that a jaw blank is provided with a T-shaped channel along its backside while a cam operated clamp with a corresponding T-shape is provided within a jaw member for securing such jaw blank to a vise jaw member.

These and other objects and aspects of the invention will become more apparent by reference to the description of the preferred embodiment and the drawings.

DESCRIPTION OF THE PREFERRED EMBODIMENT

Figure 1:
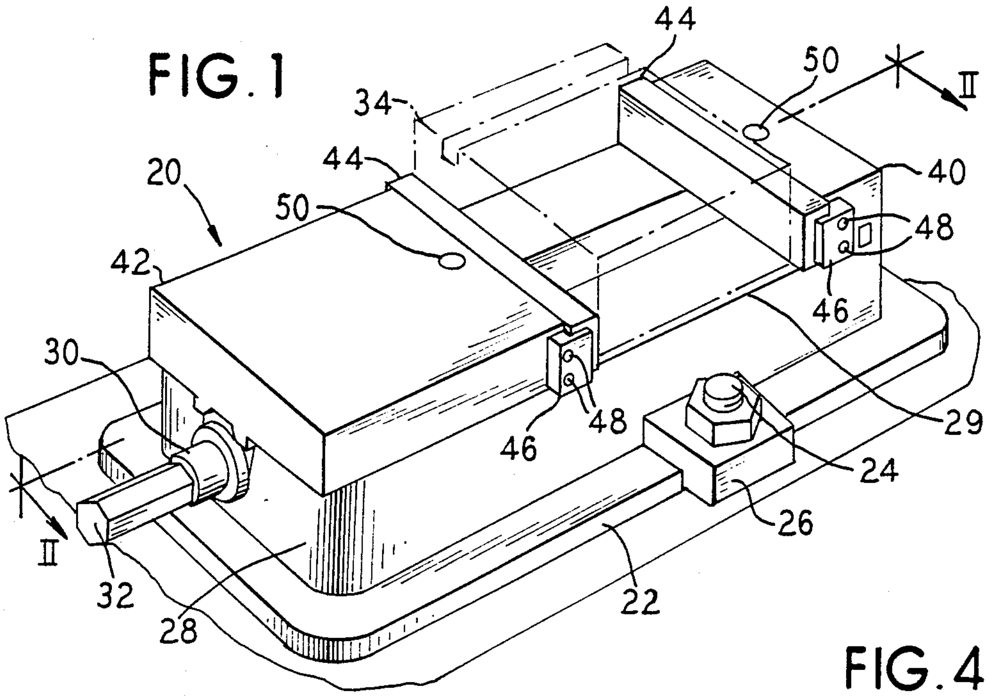
FIG. 1 is a perspective view of a vise embodying the principles of the instant invention.

A vise 20 embodying the principles of the invention is shown in FIGS. 1–4. The vise 20 has a base 22 secured to a table or other surface (not shown) by a bolt 24 inserted through a lug 26. Sitting upon the base 22 is a gear block 28 having a top surface 29 which serves as a vise bed. The gear block 28 contains a gear shaft 30 which includes a socket end 32 to enable one to turn or crank the gear shaft 30.

Sitting upon the gear box 28 are a fixed vise jaw member 40 and a movable vise jaw member 42. Both jaw members are fitted with identical removably securable jaw blanks 44. For reasons which will become apparent below, the jaw members are provided with stops 46 which provides a precise coplanar stopping point when they are placed on the jaw members 40 and 42. Screws 48 secure the stops 46 to the jaw members 40 and 42.

Also shown in FIG. 1 are bores 50 in which eccentric cam bolts 52 are located for manipulating a clamping mechanism which secures the jaw blanks 44 to the jaw members 40 and 42. Once secured, the jaw blanks 44 are used as gripping surfaces to hold a workpiece 34 therebetween.

Figure 3:
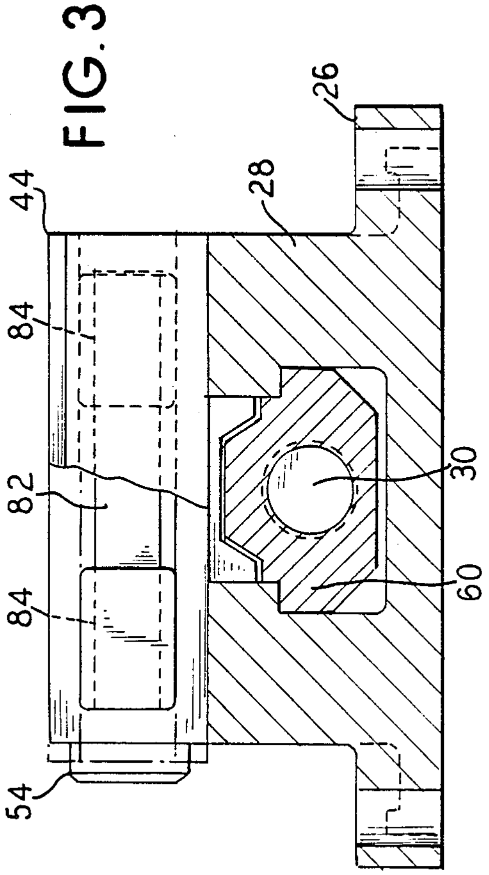
FIG. 3 a cross-sectional view of the vise of FIG. 1 taken along the line III—III of FIG. 2.

It is most clearly shown in FIG. 3 that the movable jaw member 42 rides on top of a movable block 60. The jaw member 42 is retained on the movable block 60 by a movable block wedge indentation 62 which is shaped to receive a corresponding jaw member wedge 64. A bolt 66 pulls the wedge 64 into the wedge indentation 62 to secure the jaw member 42 to the movable block 60.

The movable block 60 includes a threaded bore 70 which engages a threaded portion 72 on the gear shaft 30. The gear shaft 30 is fixed relative to the gear block 28 by conventional means. Thus, rotation of gear shaft 30 causes the threaded portion 72 to in turn cause the movable block 60 to slide on the gear block 28 as is well known in the art, carrying with it the movable jaw member 42.

Figure 4:
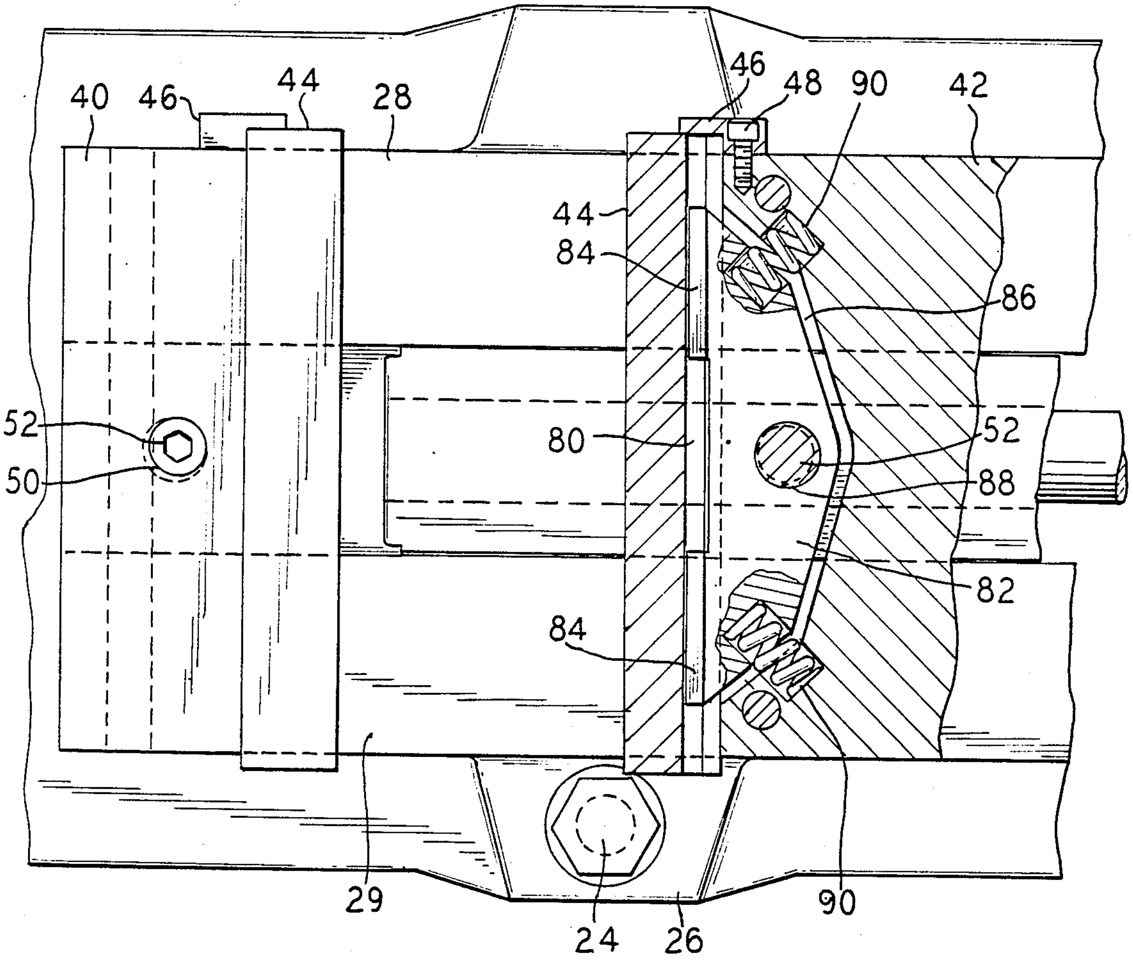
FIG. 4 is a plan view, partially broken away, of the vise of FIG. 1.
Figure 2:
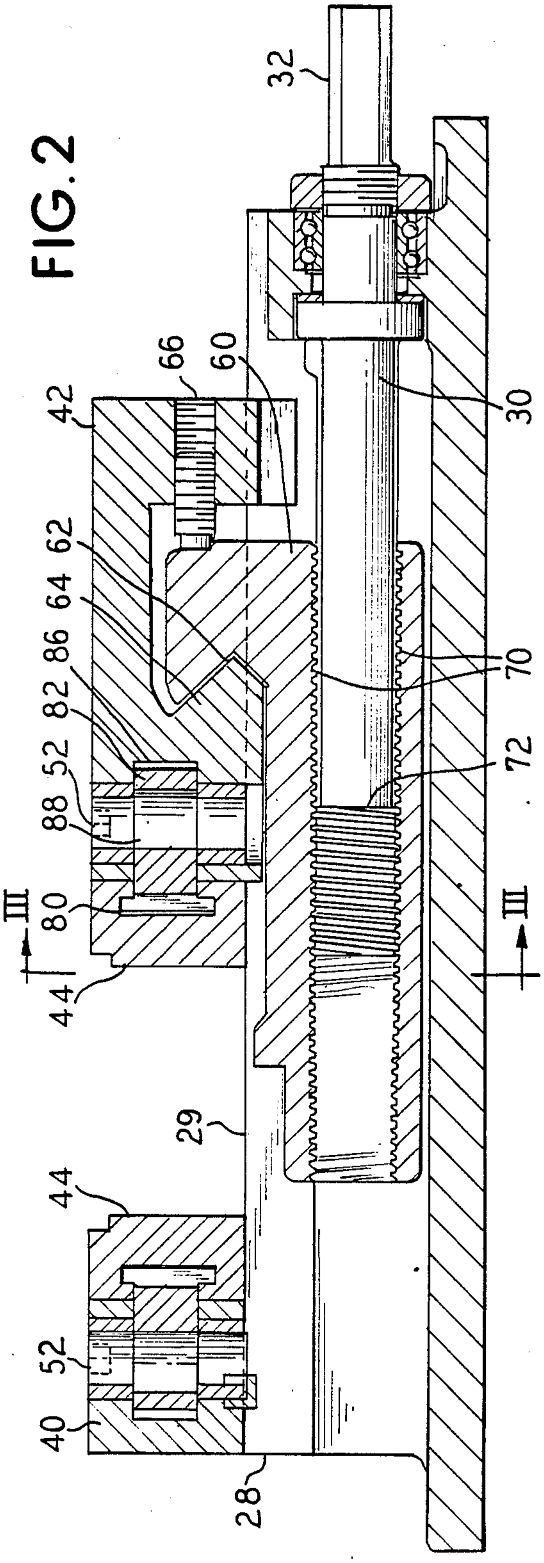
FIG. 2 is a cross-sectional view of the vise of FIG. 1 taken along the line II—II.

Referring specifically to FIGS. 2 and 4, the clamping system, according to the invention, will be described.

The clamping system of the vise which allows for quick, easy, releasable securing of a jaw blank 44 to a jaw member 40 or 42 includes a T-shaped channel 80 along the length of the back side of a jaw blank 44. A clamp including a carrier plate 82 and retaining plates 84 each having a complementary T-shape engages the T-shaped channel 80. The carrier plate 82 is located within a slot 86 cut into a jaw member 40 or 42.

A jaw blank 44 placed upon a clamp as described above, is still supported upon vise bed 29. Vise bed 29 provides a parallel surface for locating the jaw blank while the clamp serves mainly to clamp the jaw blank to the jaw vise member.

Furthermore, the T-shaped channel 80 is centrally located along the length of the backside of a jaw blank 44 to provide a symmetrical clamping system. In many of the prior art vises, the bolt holes in the jaw blanks are offset and one cannot flip such a jaw blank and still have it rest upon a vise bed. This is disadvantageous in situations where parallelism of opposing jaw blanks is important. In contrast, the instant jaw blanks may be flipped and will and still rest upon the vise bed 29. Thus, the instant arrangement doubles the usable sides of a jaw blank and reduces by one-half the expenditures for jaw blank variations.

As can be most clearly seen in FIG. 4, the carrier plate 82 has a somewhat semicircular shape and has a centrally located cam bore 88 through which the cam bolt 52 is inserted. The carrier plate 82 is normally biased away from the jaw member 40 (or 42) by compression springs 90. The cam bolt 52 is eccentrically disposed within the bore 88 so that rotation of the cam bolt 52 in one direction pulls the carrier plate 82 (and a jaw blank 44 carried thereon) toward the jaw member 40 against the action of the springs 90. Rotation of the cam bolt 52 in the opposite direction released the carrier plate 82, which is forced away from the jaw member 40 to permit removal of the jaw blank 44 therefrom. The carrier plate 82 is thus both retained and moved within the slot 86 by the cam bolt 52 in the bore 88.

It will be readily apparent to those skilled in the art that although the use of two retaining plates 84 is shown in the figures, a single retaining plate which spans the entire length of the carrier plate 82 may also be used without departing from the spirit of the invention. Also, three or more small retaining plates might be used just as easily.

In any event, because the clamp carrier plate 82 is biased outward from the slot 86 and because it is retained therein only by the centrally located cam bolt 52, the carrier plate 82 can pivot about cam bolt 52. Thus, one end of the clamp may be extended slightly from the surface of a jaw member 40 or 42 to permit easier placement of a blank 44 upon the T-shaped clamp.

Furthermore, the pivot relationship between the cam bore 88 and the two retaining plates 84 serves to distribute the clamping pressure between the two widely separated plates 84. This is especially desirable when there are variations in the shape of the T-shaped channel 80. Small dimensional variations in the thickness of the clamping surface of the T-shaped channel 80 would allow only partial clamping if a single long retaining plate were used. Similarly, should three or more retaining plates 84 be employed, without the pivot relationship, a tapered or warped T-shaped channel 80 could cause all of the clamping pressure to be allocated to only one plate 84.

Also clearly shown in FIG. 4, is the use of a stop 46 and its relationship to a blank 44. When a blank 44 is placed upon a T-shaped clamp, it is free to slide thereon. However, the stop 46 prevents a blank 44 from sliding off the end opposite to that on which it was placed. Additionally, the stop 46 aligns a blank 44 squarely with a jaw member 40 or 42 thus providing repeatable square alignment of a blank at a given location.

To secure a blank 44 to a jaw member 40 or 42, one simply rotates a cam bolt 52 until it pulls a carrier plate 82 into a slot 86 sufficiently so that a jaw blank 44 is held tightly against the face of the jaw member. Such rotation might constitute from about ¼ to ½ of a turn. Conversely, to release a jaw blank 44, one need only loosen a cam 52 from about ¼ to ½ of a turn in the opposite direction.

It is readily apparent that because only a slight amount of play is needed to loosen a clamp to release a blank 44 from a jaw member 40 or 42, the jaw members need not be separated to any great degree to allow removal of a blank 44 from its clamp. Additionally, little effort is required to rotate the cam bolt 52 ¼ to ½ of a turn, as opposed to many turns as needed to remove a conventional threaded securing bolt. Thus, when placing or removing a blank 44 on or from its clamp, very little time and effort is needed to separate the jaw members 40 and 42 and to release the blanks 44 from the jaw members.

The invention also provides that a blank 44 may be made of a metal such as aluminum to form a "soft jaw." Generally, jaw blanks are made of steel and form hard jaw faces for tight gripping. However, a blank made of aluminum provides a softer gripping surface which is more easily compressible and malleable to prevent undue squeezing of a workpiece. Also, aluminum jaws can be machined easily in varying shapes to facilitate the holding of irregularly shaped parts. An aluminum blank, moreover, can be much more easily made, by extrusion, rather than by expensive and time consuming milling.

Moreover, because the jaw blanks 44 may be easily extruded, such jaw blanks may be extruded in any length. A "long" jaw blank 44 may be extruded and located on several clamping systems placed side-by-side to enable clamping of long work pieces.

Figure 5:
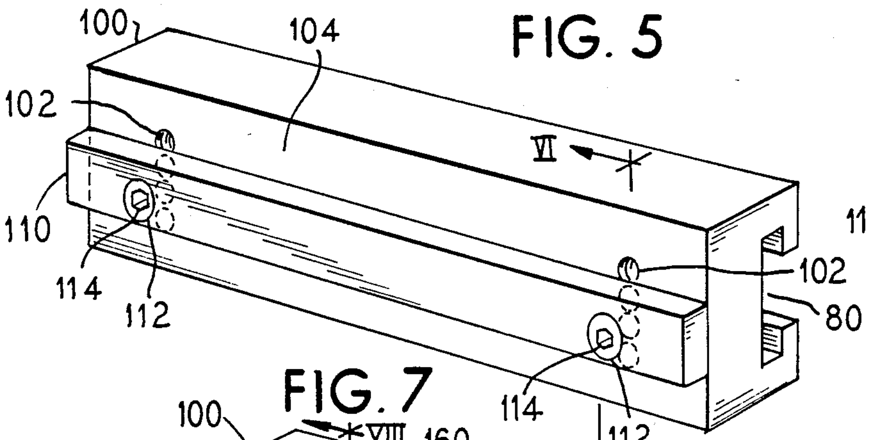
FIG. 5 is a perspective view of a jaw blank including a parallel system according to the principles of the invention.
Figure 6:
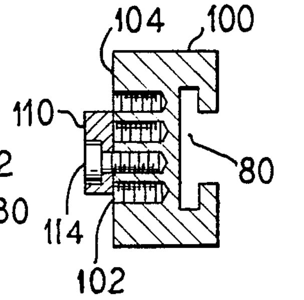
FIG. 6 is a cross-sectional view of the jaw blank and parallel system of FIG. 5 taken along the line VI—VI.

A parallel system is included with the blank 100 shown in FIGS. 5 and 6. In the parallel system, four pairs of threaded holes 102 are bored into the face 104 of the blank 100. The holes are separated by a predetermined amount such as ¼ inch. The holes are offset from a horizontal center line extending across the face of the blank 100.

Furthermore, the parallel system includes a parallel bar 110 with two bores 112 which are also offset from a horizontal center line, for example, by 1/32 inch. The bores are counterbored so that socket shoulder bolts 114 may be used to secure a bar 110 to a blank 100, the bolts 114 being flush with the surface of the parallel bar 110.

Because the pairs of holes 102 and the bores 112 are offset from horizontal center lines, it is possible to construct sixteen different parallel positions using the same blank 100 and parallel bar 110. The blank 100 may be rotated 180 degrees to permit four more positions in addition to the original four while the parallel bar 110 may be rotated 180 degrees to double the number of positions. This is facilitated by the easy and quick reversal of the blank 100 which can be accomplished by the abovedescribed clamping system.

Of course, more holes may be drilled to provide yet a further number of parallel positions. Moreover, by choosing appropriate offsets from the center lines, any number of increments in positions may be provided. For example, the parallel bores 112 may be offset 1/16 inch to provide 1/16 inch increments while the holes 102 may be separated by ⅛ inch to provide ⅛ inch increments. Additionally, the holes 102 may be offset by 1/32 inch to provide 1/32 inch increments.

Figure 7:
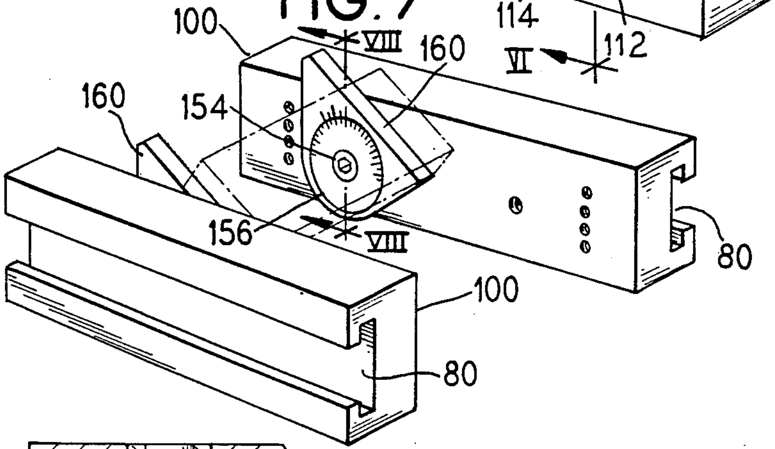
FIG. 7 is a perspective view of a jaw blank including an angle parallel system according to the principles of the invention.
Figure 8:
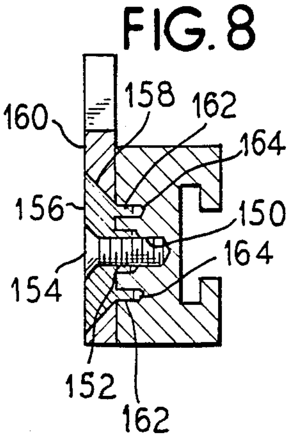
FIG. 8 is a cross-sectional view of the jaw blank and angle parallel system of FIG. 7 taken along the line VIII—VIII.

Shown in FIGS. 7 and 8 is an angle parallel system which may be used with a blank 100. The blank 100 is further provided with two bores 150 which have counterbores 152. The bores 150 receive flat head bolts 154 which secure tapered hubs 156 to the blank 100. The tapered hubs 156 are received within similarly tapered bores 158 of angle parallels 160 to secure same to the blank 100. The tapered shape of the tapered bores 158 and tapered hubs 156 allows the angle parallels 160 to rotate about the hubs 156. However, the hubs 156 are prevented from rotating by anchors 162 extending therefrom into anchor holes 164 within the blank 100.

Each hub 156 and each angle parallel 162 are provided with a Vernier scale so that the angle parallel may be placed at an exact angle. Additionally, because a hub 156 is anchored, rotation of the hub is impossible while tightening flat head bolt 154.

The stops 46 and the jaw members 40 and 42 maintain alignment of blanks 100 and hence, a pair of blanks with angle parallels will also be aligned. This insures a coplanar surface between the jaw members regardless of how wide a workpiece placed therebetween may be.

Of course, with either parallel system described above, the jaw blank employed may include counterbored holes to allow such blank to be secured directly to prior art vise jaw members with shoulder bolts. In either case, the jaw blank would first be secured to the vise jaw member and then the parallel bars or angle parallels would be secured to the jaw blank as described above.

Figure 10:
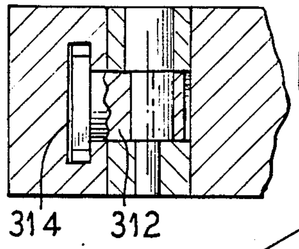
FIG. 10 is a cross-sectional view of a clamp used in the adaptor shown in FIG. 9.
Figure 9:
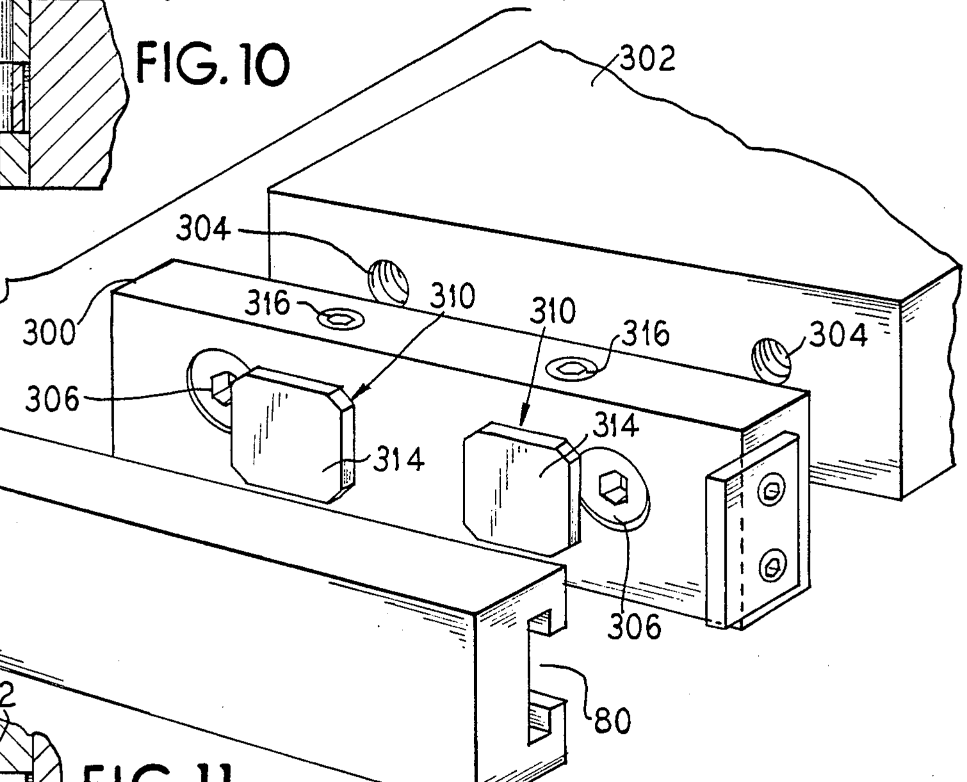
FIG. 9 is a perspective view of an adaptor for adapting the principles of the invention to a prior art vise.
Figure 11:
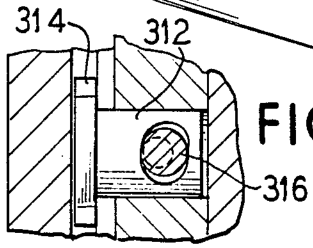
FIG. 11 is a plan view, partially broken away, of the clamp shown in FIG. 10.

Finally, in FIGS. 9–11, there is shown an adaptor 300 for adapting the present invention to an existing vise utilizing conventional means for securing a jaw blank to a jaw member 302. As is shown, the jaw member 302 includes threaded bores 304 for receiving a pair of shoulder bolts. The adaptor 300 includes a pair of shoulder bolts 306 to secure the adaptor 300 to the jaw member 302.

The jaw member 300 also includes a pair of T-shaped clamps 310 each having a substantially rectangular carrier plate 312 and a retaining plate 314. Of course, a single long clamp may be used but only the dual clamp arrangement is presently shown.

The two clamps include an eccentric cam 316 to move the clamps in and out of the adaptor 300 as was described above in connection with the first discussed embodiment. No spring biasing of the clamps is provided, as the adaptor 300 is designed to be simple and inexpensive. However, such spring biasing could easily be provided as is well known in the art. Finally, a stop 46 is provided with the adaptor 300 to provide repeatable alignment of a blank 44 or 100 as discussed above.

It can be seen that the use of the adaptor 300 is very similar to the use of the first described embodiment of the invention. However, in the case of the use of the adaptor 300, a worker needs to loosen or tighten two cams 52 to release or secure a blank to a jaw member. The extra time and effort needed to loosen or tighten the second cam is minimal and the entire procedure is still much quicker and much less costly than that of the prior art. Thus, the instant invention provides a set-up procedure for a vise which is very quick and which includes many advantages over the prior art.

While a preferred embodiment has been shown, many other modifications and variations which fall within the spirit and scope of the invention will be obvious to those skilled in the art. It is intended that those modifications and variations be covered also by the attached claims.

We claim as our invention:

1. A vise comprising:

an elongate base member having a longitudinal axis;

a pair of jaw members with opposing faces;

means for moving said jaw members toward and away from each other along said longitudinal axis on said base member for releasably grasping a workpiece therebetween;

a jaw blank for a jaw member having a front face and a back side; and means for releasably securing a jaw blank to a jaw member including an channel located at the back side of said blank, retaining means for slidably engaging said channel, carrier means for carrying said retaining means, means for locating said carrier means with said jaw member, and means for moving said carrier means within said jaw member to a first extreme position wherein said jaw blank on said retaining means is spaced from said jaw member and to a second extreme position wherein said jaw blank on said retaining means is clamped against said jaw member, said means for moving including an opening located in said carrier means and a cam positioned within said opening, said cam operating against a wall of said opening.

2. A vise as set forth in claim 1, including at least two restraining means carried by said carrier means, and wherein said cam is positioned centrally along said carrier means so that camming forces exerted by said cam are transferred as equal restraining forces to each of said restraining means.

3. A vise as set forth in claim 1 wherein said channel is T-shaped.

4. A vise as set forth in claim 1 wherein said jaw member further includes means for spring biasing said carrier means outward from said jaw member.

5. A vise as set forth in claim 1 wherein said blank is made of an extrudable metal.

6. A vise comprising:

an elongated base member having a longitudinal axis;

a pair of jaw members with opposing faces;

means for moving said jaw members toward and away from each other along said longitudinal axis on said base member for releasably grasping a workpiece therebetween; and a jaw blank releasably secured to a jaw member, said jaw blank consisting of extrudable metal, and including a channel, retaining means for slidably engaging said channel, carrier means for carrying said retaining means, means for locating said carrier means within said jaw member, and means for moving said carrier means within said jaw member to a first extreme position wherein said jaw blank on said retaining means is spaced from said jaw member and to a second extreme position wherein said jaw blank on said retaining means is clamped against said jaw member, said means for moving including an opening located in said carrier means and a cam positioned within said opening, said cam operating against a wall of said opening.

7. A vise as set forth in claim 6 wherein said jaw blank consists of aluminum.

* * * * *